US010066364B2

(12) United States Patent
Yamazaki et al.

(10) Patent No.: US 10,066,364 B2
(45) Date of Patent: Sep. 4, 2018

(54) CONSTRUCTION MACHINE

(71) Applicant: KCM Corporation, Kako-gun, Hyogo (JP)

(72) Inventors: Yasuo Yamazaki, Tsuchiura (JP); Takashi Takeyama, Tsuchiura (JP); Keigo Kikuchi, Tsuchiura (JP); Akira Shimohira, Tsuchiura (JP); Keisuke Kobayashi, Hyogo (JP)

(73) Assignee: KCM Corporation, Hyogo (JP)

( * ) Notice: Subject to any disclaimer, the term of this patent is extended or adjusted under 35 U.S.C. 154(b) by 0 days.

(21) Appl. No.: 15/508,534

(22) PCT Filed: Oct. 23, 2015

(86) PCT No.: PCT/JP2015/079987
§ 371 (c)(1),
(2) Date: Mar. 3, 2017

(87) PCT Pub. No.: WO2016/103885
PCT Pub. Date: Jun. 30, 2016

(65) Prior Publication Data
US 2017/0284060 A1 Oct. 5, 2017

(30) Foreign Application Priority Data

Dec. 24, 2014 (JP) ................................. 2014-260477

(51) Int. Cl.
*B01D 53/92* (2006.01)
*E02F 9/08* (2006.01)
(Continued)

(52) U.S. Cl.
CPC ............ *E02F 9/0866* (2013.01); *B01D 53/92* (2013.01); *B60K 11/02* (2013.01); *B60K 13/04* (2013.01);
(Continued)

(58) Field of Classification Search
CPC ..... E02F 9/0866; E02F 9/0883; E02F 9/0891; E02F 9/18; E02F 3/34; B01D 53/92;
(Continued)

(56) References Cited

U.S. PATENT DOCUMENTS 9,732,653 B2 * 8/2017 Ogawa .................. F01N 3/2896
2007/0023225 A1 * 2/2007 Abe ....................... F01N 13/102
180/309
(Continued)

FOREIGN PATENT DOCUMENTS

JP 2009-138526 A 6/2009
JP 2011-12661 A 1/2011
(Continued)

OTHER PUBLICATIONS

International Search Report (PCT/ISA/210) issued in PCT Application No. PCT/JP2015/079987 dated Dec. 8, 2015 with English translation (Four (4) pages).

(Continued)

*Primary Examiner* — James A Shriver, II
*Assistant Examiner* — Brian L Cassidy
(74) *Attorney, Agent, or Firm* — Crowell & Moring LLP

(57) ABSTRACT

A construction machine includes: a cover that covers an engine and a radiator; a radiator fan that is arranged at the rear of a vehicle body frame and discharges exhaust gas toward the rear of the vehicle body frame from the inner space of the cover; an injection device that injects a reducing agent into exhaust gas of the engine; a tank housing section that is arranged at one side of the vehicle body frame, includes an introduction section for introducing outside air, and houses a tank for storing the reducing agent injected by the injection device; and a connection section that is arranged in either the cover or the vehicle body frame and in the tank housing section, connects the inner space of the (Continued)

tank housing section and the inner space of the cover, and allows the outside air and the pipe to pass therethrough, the outside air having been introduced from the introduction section by the suction pressure of the radiator fan, the pipe supplying the reducing agent to the injection device.

9 Claims, 6 Drawing Sheets

(51) Int. Cl.
*F01N 3/20* (2006.01)
*F02B 61/00* (2006.01)
*F01P 5/02* (2006.01)
*F01N 3/28* (2006.01)
*B60K 11/02* (2006.01)
*B60K 13/04* (2006.01)
*E02F 9/18* (2006.01)
*E02F 3/34* (2006.01)

(52) U.S. Cl.
CPC .......... *E02F 9/0883* (2013.01); *E02F 9/0891* (2013.01); *E02F 9/18* (2013.01); *F01N 3/20* (2013.01); *F01N 3/2882* (2013.01); *F01N 3/2896* (2013.01); *F01P 5/02* (2013.01); *F02B 61/00* (2013.01); *E02F 3/34* (2013.01)

(58) Field of Classification Search
CPC ........... B60K 11/02; B50K 13/04; F01N 3/20; F01N 3/2882; F01N 3/2896; F01P 5/02; F02B 61/00
See application file for complete search history.

(56) References Cited

U.S. PATENT DOCUMENTS

| | | | |
|---|---|---|---|
| 2010/0038162 A1* | 2/2010 | Kamiya | B01D 53/9431 180/69.6 |
| 2010/0266458 A1 | 10/2010 | Takeshita et al. | |
| 2014/0056675 A1 | 2/2014 | Kitaoka et al. | |
| 2014/0290224 A1* | 10/2014 | Kanamori | F01N 3/208 60/295 |
| 2014/0318882 A1* | 10/2014 | Sawada | B60K 13/04 180/309 |
| 2014/0326527 A1* | 11/2014 | Harada | E02F 9/0866 180/309 |
| 2015/0000258 A1* | 1/2015 | Kondo | F01N 13/002 60/301 |
| 2015/0075892 A1* | 3/2015 | Numa | B60K 11/06 180/309 |
| 2015/0086314 A1* | 3/2015 | Okuda | E02F 3/30 414/685 |
| 2015/0192052 A1* | 7/2015 | Ogawa | F01N 3/208 60/295 |
| 2015/0204051 A1* | 7/2015 | Noda | E02F 9/16 180/89.12 |
| 2015/0337520 A1* | 11/2015 | Yabe | E02F 3/3411 180/68.1 |
| 2015/0369109 A1* | 12/2015 | Mitsuda | E02F 9/0891 180/309 |
| 2016/0115840 A1* | 4/2016 | Azuma | F01N 13/009 180/309 |
| 2017/0009639 A1* | 1/2017 | Mitsuda | F01N 3/106 |
| 2017/0009683 A1* | 1/2017 | Mitsuda | F02D 41/263 |

FOREIGN PATENT DOCUMENTS

| | | |
|---|---|---|
| JP | 2013-249663 A | 12/2013 |
| JP | 2014-8827 A | 1/2014 |
| JP | 2014-214719 A | 11/2014 |
| WO | WO 2012/117753 A1 | 9/2012 |
| WO | WO 2014/155505 | 10/2014 |

OTHER PUBLICATIONS

Japanese-language Written Opinion (PCT/ISA/237) issued in PCT Application No. PCT/JP2015/079987 dated Dec. 8, 2015 (Three (3) pages).
Korean-language Office Action issued in counterpart Korean Application No. 10-2017-7005351 dated Apr. 12, 2018 (five (5) pages).

* cited by examiner

FIG. 3
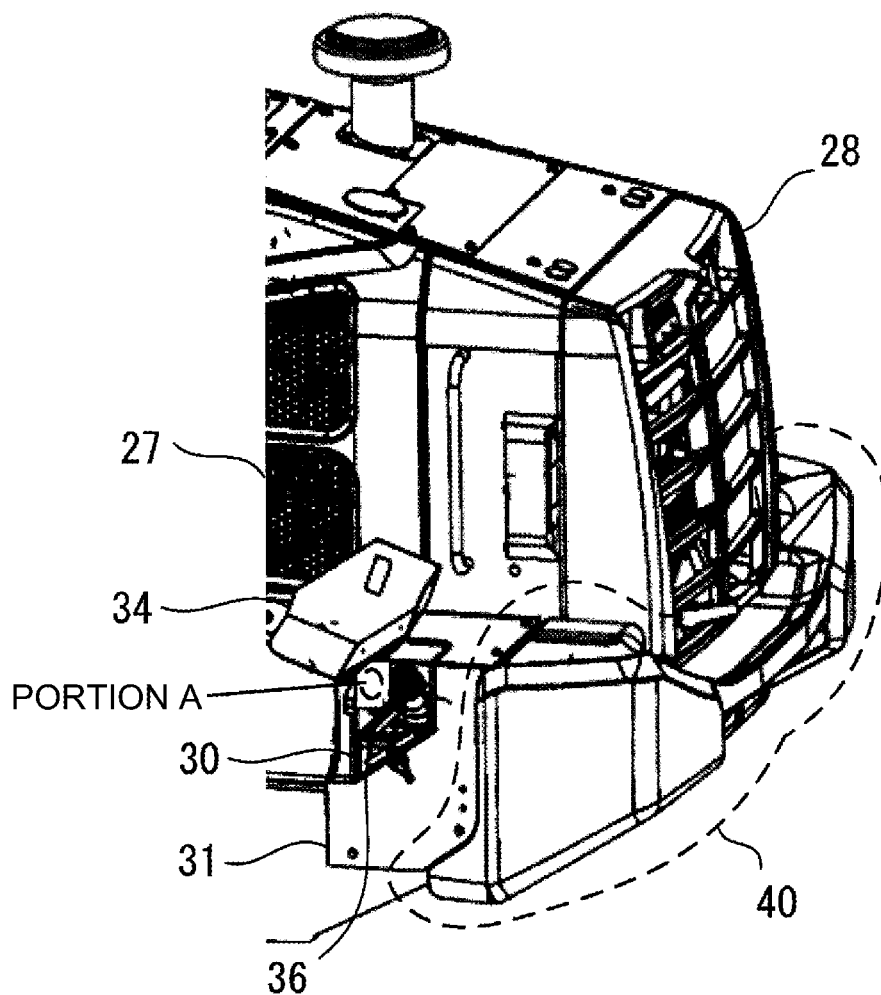
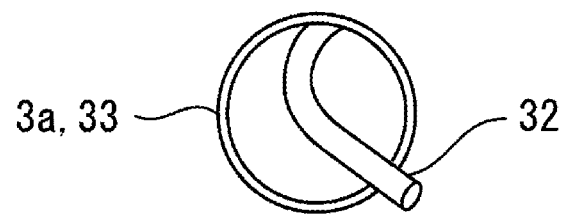
DETAIL OF PORTION A

CONSTRUCTION MACHINE

TECHNICAL FIELD

The present invention relates to a construction machine.

BACKGROUND ART

It is known that urea water used for exhaust gas treatment of an industrial vehicle deteriorates in quality at a high temperature even when the temperature is equal to or below a temperature at which ammonia is generated. In Patent Literature 1, an invention is disclosed in which a urea water tank is installed in a space adjacent to a radiator space where the air taken from the outside passes through and separated by a bulkhead. An object with which the urea water tank executes heat exchange is the air staying in the space, and the air taken from the outside cannot be utilized as a low temperature heat source.

CITATION LIST

Patent Literature

Patent Literature 1: International Publication WO2012/117753

SUMMARY OF INVENTION

Technical Problem

According to the invention described in Patent Literature 1, because the fresh outside air cannot be introduced to the periphery of a reducing agent tank, the reducing agent tank cannot be cooled efficiently.

Solution to Problem

According to the first aspect of the present invention, a construction machine includes: a vehicle body frame; an engine that is mounted on the vehicle body frame; a radiator that is mounted at the rear of the vehicle body frame than the engine; a bulkhead that separates the engine and the radiator; a cover that covers the engine and the radiator; a radiator fan that is arranged at the rear of the vehicle body frame and discharges exhaust gas toward the rear of the vehicle body frame from the inner space of the cover; an injection device that injects a reducing agent into exhaust gas of the engine; a tank housing section that is arranged at one side of the vehicle body frame, includes an introduction section for introducing outside air, and houses a tank for storing the reducing agent injected by the injection device; and a connection section that is arranged in either the cover or the vehicle body frame and in the tank housing section, connects the inner space of the tank housing section and the inner space of the cover, and allows the outside air and the pipe to pass therethrough, the outside air having been introduced from the introduction section by the suction pressure of the radiator fan, the pipe supplying the reducing agent to the injection device.

Advantageous Effects of Invention

According to the present invention, the reducing agent tank can be cooled efficiently.

BRIEF DESCRIPTION OF DRAWINGS

FIG. 3 is a perspective view as viewed from a left rear portion of the wheel loader.

DESCRIPTION OF EMBODIMENTS (Embodiment)

Below, an embodiment applying the present invention to a wheel loader will be described referring to FIGS. 1 to 6.

Figure 1:
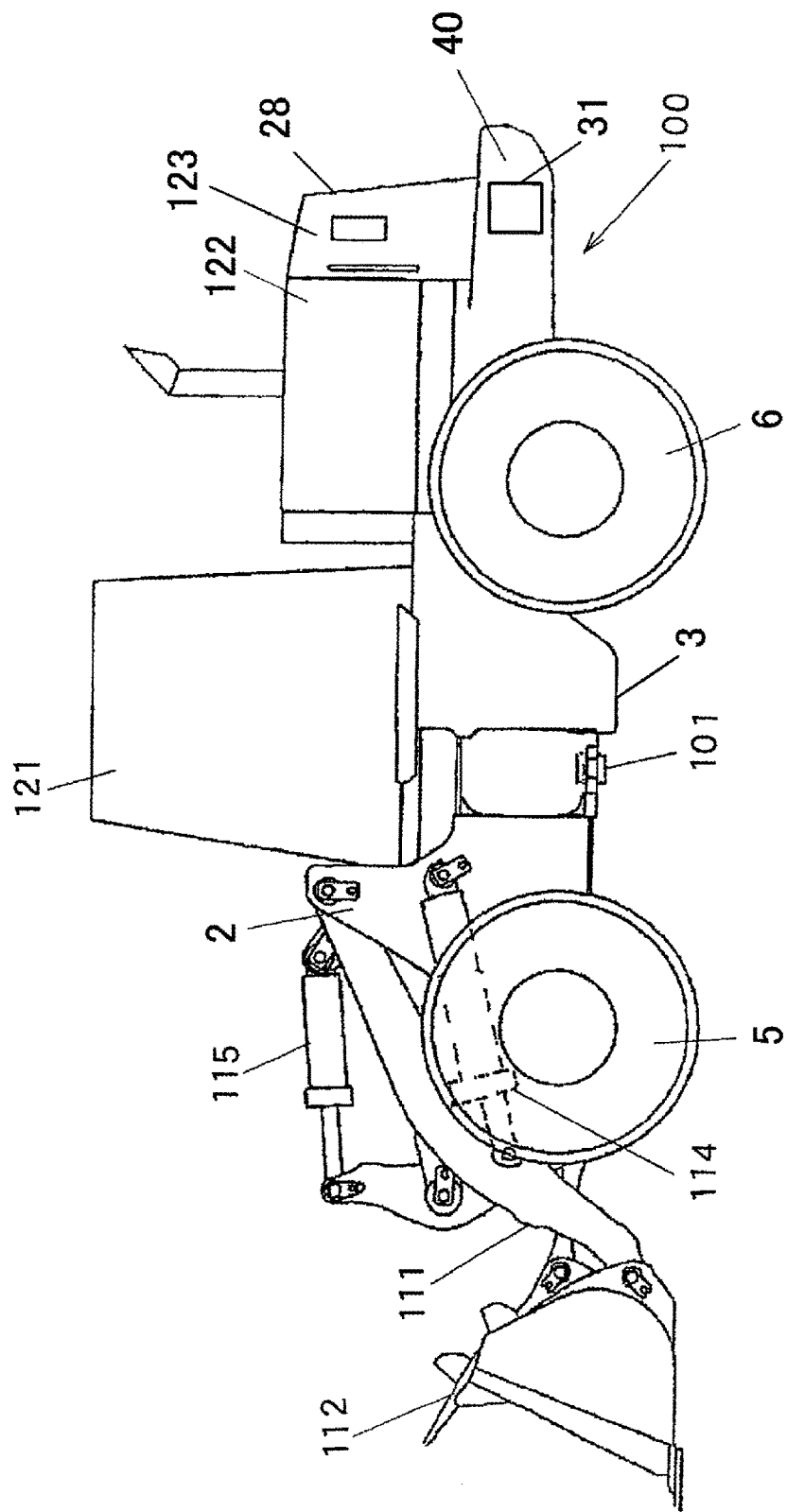
FIG. 1 is a side view of a wheel loader.

FIG. 1 is a side view of a wheel loader that is an example of a working vehicle related to the present embodiment. A wheel loader 100 has a construction in which a front frame 2 and a rear frame 3 are connected by a center pin 101 so as to be rotatable each other, the front frame 2 configuring a vehicle body front portion, the rear frame 3 configuring a vehicle body rear portion. An arm 111, a bucket 112, and tires 5 are arranged in the vehicle body front portion. The bucket 112 is moved up and down by a lift arm cylinder 114, and is rotated by a bucket cylinder 115. An operator's cab 121, an engine chamber 122, a radiator chamber 123, a tank housing box 31, a counterweight 40, and tires 6 are arranged in the vehicle body rear portion. The operator's cab 121, the engine chamber 122, and the radiator chamber 123 are arranged on the rear frame 3, and the tank housing box 31, a rear grill 28, and the counterweight 40 are arranged in the rear portion of the rear frame 3. With respect to the engine chamber 122 and the radiator chamber 123, the side surface lower portion thereof is covered by the rear frame 3, and the side surface upper portion and the top surface thereof are covered by a cover 20 described below. A vehicle body rear section 120 will be described in detail.

Figure 2:
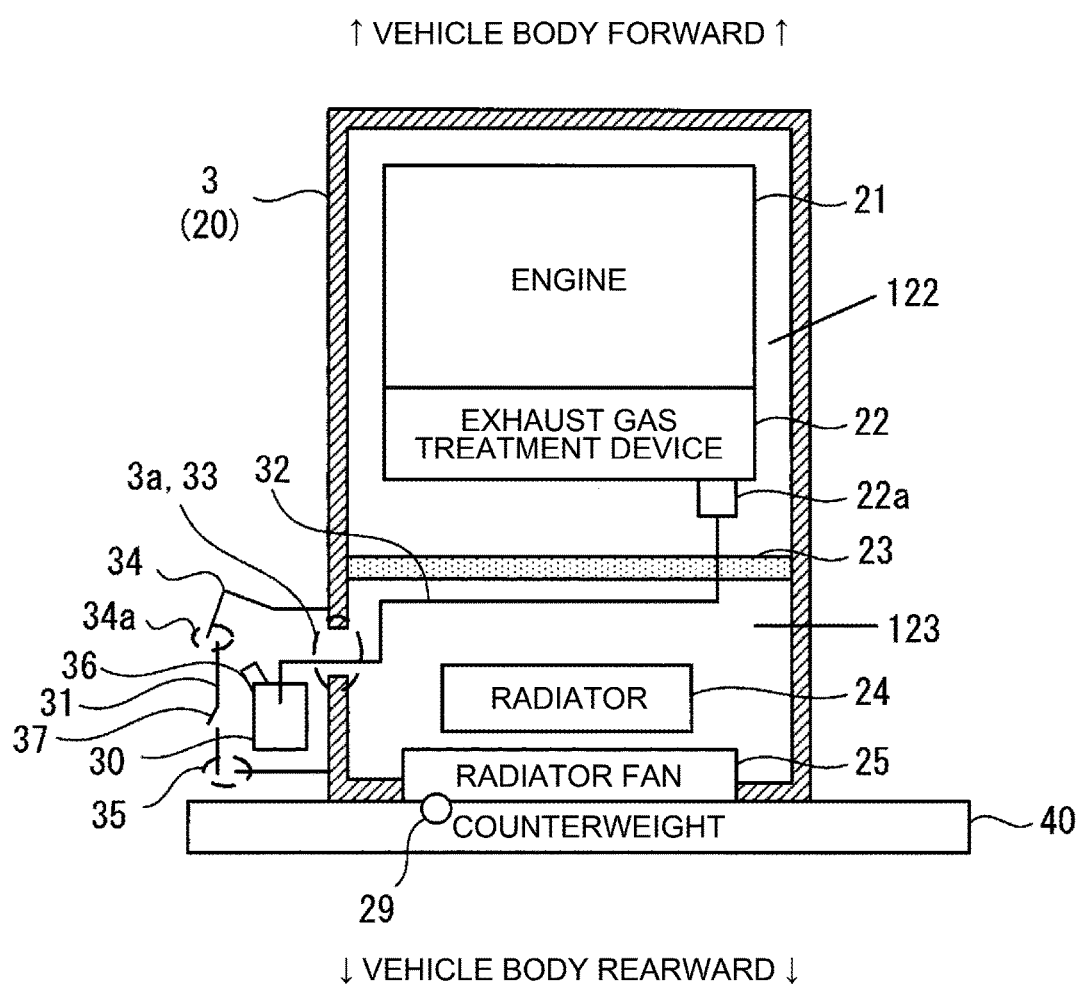
FIG. 2 is a schematic view of a plan view of a vehicle body rear portion of the wheel loader.

FIG. 2 is a schematic view of a plan view of the vehicle body rear section 120 excluding the operator's cab 121 and the tires 6. In FIG. 2, the cover 20 covering the top surface is omitted. The engine chamber 122 and the radiator chamber 123 are surrounded by the rear frame 3 and the cover 20 at their side surfaces, the engine chamber 122 becoming hot by an engine 21, the radiator chamber 123 being forced-air-cooled by a radiator fan 25. The engine chamber 122 and the radiator chamber 123 are separated by a bulkhead 23, and it is configured that the heat generated in the engine chamber 122 is hardly transferred to the radiator chamber 123. In the engine chamber 122, the engine 21, an exhaust gas treatment device 22, and a reducing agent injection device 22a are provided, the exhaust gas treatment device 22 processing the exhaust gas discharged from the engine 21, the reducing agent injection device 22a injecting the reducing agent to the inside of the exhaust gas treatment device 22. The reducing agent injected by the reducing agent injection device 22a is supplied from a reducing agent tank 30 located at the rear in the left of the vehicle body through a reducing agent supply pipe 32. A fuel supply port 29 is arranged at a position at the rear of the vehicle frame and closer to the reducing agent tank 30 than the center line CL of the vehicle body frame 3 described below, the fuel used by the engine 21 being supplied from the outside to the fuel supply port 29. The position of the fuel supply port 29 will be described again below using FIG. 6.

In the radiator chamber 123, a radiator 24 and the radiator fan 25 are provided, the radiator 24 cooling the engine cooling water that is heated by the engine 21, the radiator fan 25 cooling the radiator 24. The cover 20 includes a cover slit 27 that is not illustrated, the cover 20 covering the side surface upper portion and the top portion of the radiator chamber 123, and the outside air is taken from the cover slit 27 to the inner space of the radiator chamber 123. The rear frame 3 includes a frame hole 3a, and connects the inner space of the radiator chamber 123 and the inner space of the reducing agent tank 30 as described below, the rear frame 3 covering the side surface lower portion of the radiator chamber 123.

The radiator fan 25 discharges the air inside the radiator chamber 123 to the rear of the vehicle body, namely to the lower direction of FIG. 2. By activation of the radiator fan 25, the pressure inside the radiator chamber 123 becomes lower than the atmospheric pressure around the wheel loader 100, and therefore the outside air is taken to the radiator chamber 123 through the cover slit 27 and the frame hole 3a. In other words, the radiator fan 25 generates a pressure lower than the atmospheric pressure namely the suction pressure in the radiator chamber 123, and takes in the outside air through the cover slit 27 and the frame hole 3a. The radiator 24 cools the engine cooling water that has cooled the engine 21 and has become hot.

The tank housing box 31 is a box for housing the reducing agent tank 30, and includes a housing box hole 33, an opening/closing lid 34, a water drain hole 35, a reducing agent supply port 36, and a housing box slit 37. The tank housing box 31 is fixed to the rear frame 3 that is positioned on the rear left side surface of the vehicle body so that the frame hole 3a arranged in the rear frame 3 and the housing box hole 33 match. In other words, the inner space of the reducing agent tank 30 and the inner space of the radiator chamber 123 are connected to each other by the frame hole 3a and the housing box hole 33.

The reducing agent tank 30 is a tank for storing a reducing agent that treats a combustion gas discharged by the engine 21, for example urea water that is an aqueous solution of ammonia that is a reducing agent. The reducing agent stored in the reducing agent tank 30 is supplied to the reducing agent injection device 22a through the reducing agent supply pipe 32. The other end of the reducing agent supply pipe 32 that is connected to the reducing agent tank 30 reaches the radiator chamber 123 through the frame hole 3a and the housing box hole 33, passes through the bulkhead 23, and is connected to the reducing agent injection device 22a of the engine chamber 122. Because the inside of the engine chamber 122 is hot, the reducing agent supply pipe 32 is laid out so that the length in the inside of the engine chamber 122 of the reducing agent supply pipe 32 becomes short in order to prevent deterioration of the reducing agent by temperature rise.

The opening/closing lid 34 is a lid arranged for allowing an operator to get access easily to the reducing agent supply port 36 from the outside. Even in a state where the opening/closing lid 34 is closed, there is a small gap namely a gap 34a of the opening/closing lid, and the air is taken in from the outside by the suction pressure of the radiator fan 25. The water drain hole 35 is a hole for discharging the reducing agent flooded into the tank housing box 31, the rainwater intruded, and so on. By the suction pressure of the radiator fan 25, the air is taken in to the inner space of the tank housing box 31 from the outside through the water drain hole 35 also. The housing box slit 37 is a gap for introducing the outside air to the inner space of the tank housing box 31.

The air taken in from the outside through the gap 34a of the opening/closing lid, the water drain hole 35, and the housing box slit 37, namely the outside air, moves from the inner space of the reducing agent tank 30 to the inner space of the radiator chamber 123 through the housing box hole 33 and the frame hole 3a, and is discharged to the outside by the radiator fan 25. This air taken in from the outside cools the reducing agent tank 30, the reducing agent supply pipe 32, and the radiator 24.

The counterweight 40 is arranged in the rear portion of the rear frame 3. The counterweight 40 is long in the vehicle width direction of the wheel loader 100, and protrudes to the outer side of the wheel loader 100 beyond the tank housing box 31 that is disposed on the side surface of the vehicle body. Also, as described below, the counterweight 40 protrudes to the downward direction of the wheel loader 100 beyond the tank housing box 31. Therefore, the counterweight 40 protects the tank housing box 31 when the wheel loader 100 rotates or climbs a slope.

(Connection Portion of Radiator Chamber and Tank Housing Box)

The connection portion of the radiator chamber 123 and the tank housing box 31, namely the configuration of the frame hole 3a and the housing box hole 33, will be described using FIG. 3. FIG. 3 is a perspective view of the wheel loader 100 as viewed from rear left. In FIG. 3, the opening/closing lid 34 of the tank housing box 31 is open, and the reducing agent tank 30 and the like housed in the tank housing box 31 are exposed. Also, in FIG. 3, the water drain hole 35 and the housing box slit 37 are omitted.

The housing box hole 33 is arranged in the face where the tank housing box 31 comes into contact with the rear frame 3, and comes in securely contact with the frame hole 3a of the rear frame 3. As shown in the detail of portion A in FIG. 3, in the housing box hole 33 and the frame hole 3a, the reducing agent supply pipe 32 is made pass through, the reducing agent supply pipe 32 connecting the reducing agent tank 30 and the reducing agent injection device 22a to each other. Because the cross-sectional area of the housing box hole 33 and the frame hole 3a is larger than the cross-sectional area of the reducing agent supply pipe 32, also the outside air introduced through the gap 34a of the opening/closing lid, the water drain hole 35, and the housing box slit 37 by the suction pressure of the radiator fan 25 can pass through.

(Shape of Counterweight)

Figure 4:
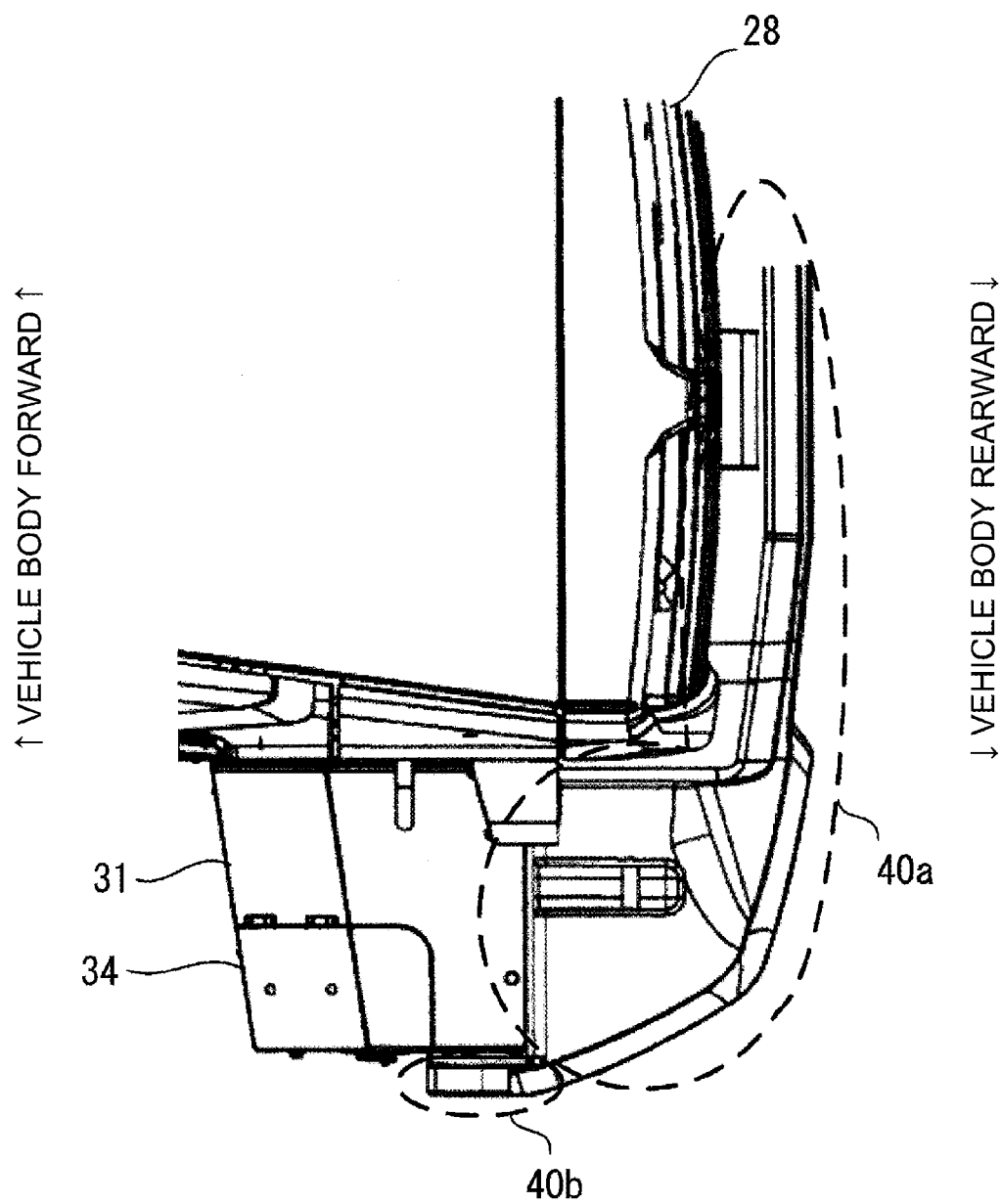
FIG. 4 is a plan view of a left rear portion of the wheel loader.
Figure 5:
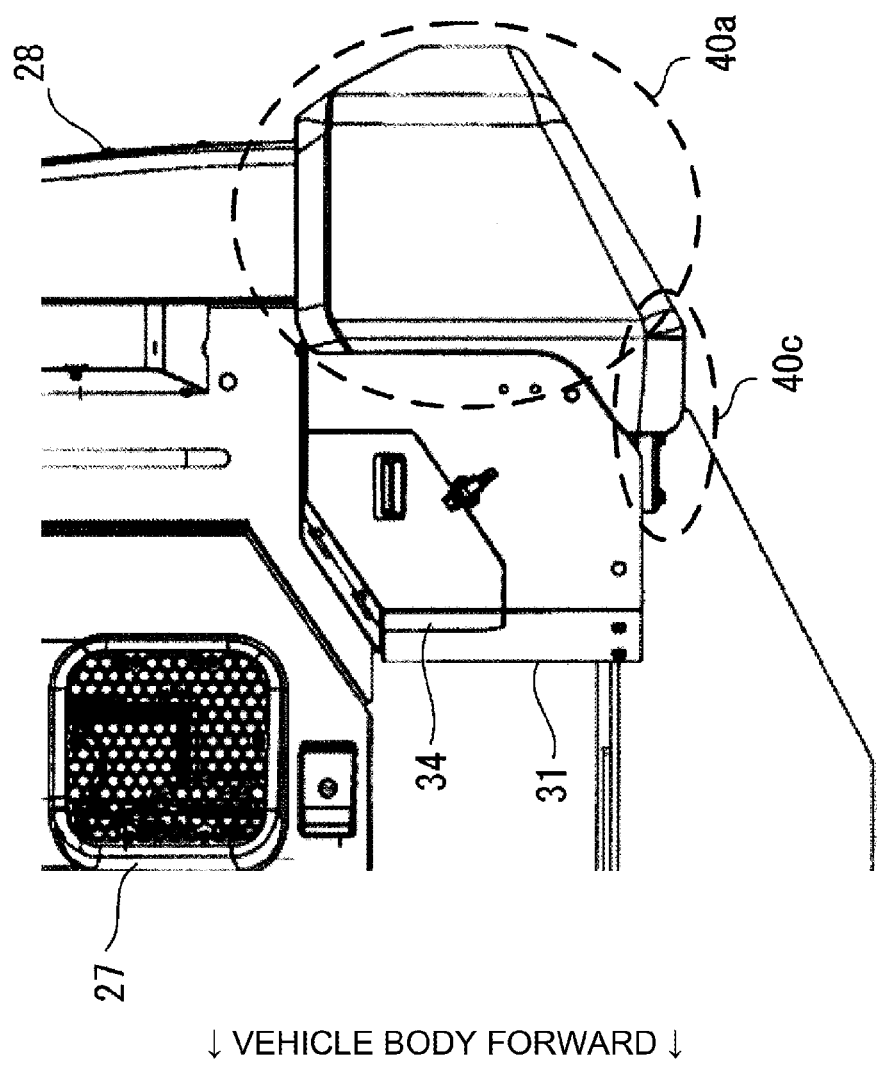
FIG. 5 is a side view of a left rear portion of the wheel loader.

The shape of the counterweight 40 will be described using FIGS. 3 to 5. FIG. 3 is a perspective view of the wheel loader 100 as viewed from rear left, FIG. 4 is a plan view of a rear left portion of the wheel loader 100, and FIG. 5 is a side view of a rear left lower portion of the wheel loader 100. As shown in FIG. 3, the counterweight 40 is long in the vehicle width direction of the wheel loader 100, and the left end portion has a shape of covering the tank housing box 31 from the side surface and the bottom surface. The counterweight 40 includes a main weight section 40a, a side surface protection section 40b and a bottom surface protection section 40c. As shown in FIG. 4, the side surface protection section 40b protrudes in the vehicle width direction of the wheel loader 100 beyond the tank housing box 31, and covers a part of the left side surface of the tank housing box 31. As shown in FIG. 5, the bottom surface protection section 40c protrudes in the downward direction of the rear frame 3 beyond the tank housing box 31, and covers a part of the bottom surface of the tank housing box 31. The main weight section 40a is a portion excluding the side surface protection section 40b and the bottom surface protection section 40c from the counterweight 40.

(Positional Relation of Fuel Supply Port and Reducing Agent Supply Port)

Figure 6:
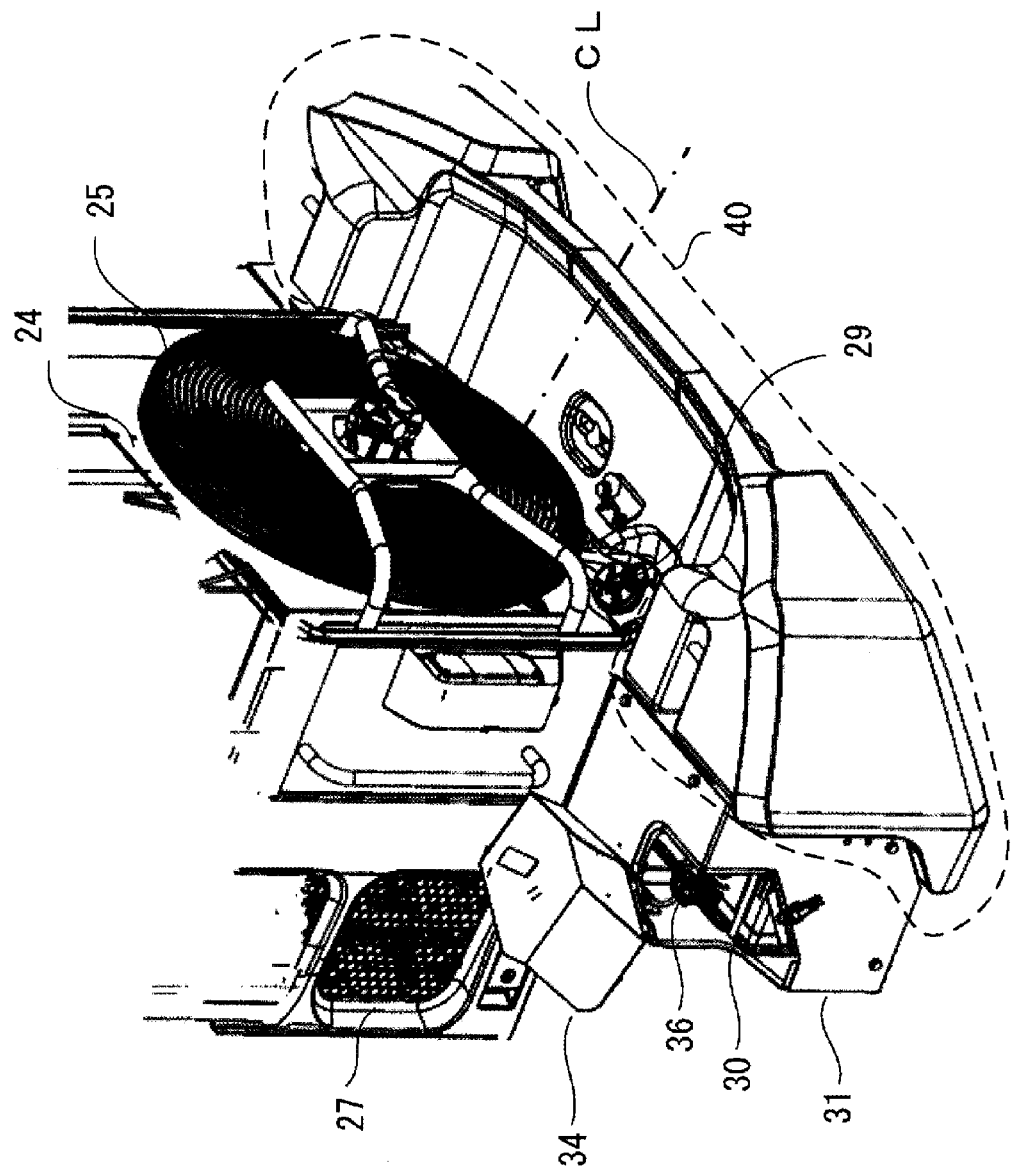
FIG. 6 is a drawing showing a state where a rear grill and an opening/closing lid are opened in a perspective view as viewed from a left rear portion of the wheel loader.

The positional relation of the fuel supply port 29 and the reducing agent supply port 36 will be described using FIG. 6. FIG. 6 is a perspective view of the wheel loader 100 as viewed from rear left in a state where the rear grill 28 covering the radiator fan 25 and the opening/closing lid 34 are opened.

The fuel supply port 29 is located at a position at the rear of the vehicle body and closer to the tank housing box 31 than the center line CL of the vehicle frame 3, namely the left side of the rear of the vehicle body, and is arranged adjacently to the radiator fan 25. The radiator fan 25 and the fuel supply port 29 are covered by the rear grill 28, and the operator opens the rear grill 28 and gets access to the fuel supply port 29.

The reducing agent supply port 36 is located in the inside of the tank housing box 31 that is arranged on the left side surface of the rear of the vehicle body. As described above, because the tank housing box 31 is covered by the counterweight 40 from the rear lower portion, the opening/closing lid 34 of the tank housing box 31 is arranged ahead in the left. The operator opens the opening/closing lid 34 and gets access to the reducing agent supply port 36.

As described above, both of the fuel supply port 29 and the reducing agent supply port 36 are located at rear left of the wheel loader 100, and the operator can get access to the both without moving. However, in order to get access to the fuel supply port 29 and the reducing agent supply port 36, it is necessary to open the rear grill 28 and the opening/closing lid 34 respectively, and therefore there is no risk that the operator mixes up the both and fills the fuel and the reducing agent erroneously.

According to the embodiment described above, the following action and effect can be obtained.

(1) The wheel loader 100 includes the rear frame 3, the engine 21 that is mounted on the rear frame 3, the radiator 24 that is mounted at the rear of the rear frame 3 than the engine 21, the bulkhead 23 that separates the engine 21 and the radiator 24, the cover 20 that covers the engine 21 and the radiator 24, the radiator fan 25 that is arranged at the rear of the rear frame 3 and discharges exhaust gas toward the rear of the rear frame 3 from the inside of the cover 20 namely from the radiator chamber 123, and the reducing agent injection device 22a that injects a reducing agent into the exhaust gas of the engine 21. The wheel loader 100 further includes the tank housing box 31 that is arranged at one side of the rear frame 3, includes the introduction section for introducing the outside air namely the gap 34a of the opening/closing lid, the water drain hole 35, and the housing box slit 37, and houses the reducing agent tank 30 for storing the reducing agent injected by the reducing agent injection device 22a, and the connection section, namely the housing box hole 33 and the frame hole 3a, which is arranged in either the cover 20 or the rear frame 3 and in the tank housing box 31, connects the inner space of the tank housing box 31 and the inner space of the cover 20 namely the radiator chamber 123, and allows the outside air and the reducing agent supply pipe 32 to pass therethrough, the outside air having been introduced from the introduction section by the suction pressure of the radiator fan 25, the reducing agent supply pipe 32 supplying the reducing agent to the injection device.

According to such a wheel loader 100, the fresh outside air is taken in to the tank housing box 31 by the suction pressure of the radiator fan 25 through the gap 34a of the opening/closing lid, the water drain hole 35, and the housing box slit 37. Accordingly, the reducing agent tank 30 housed in the tank housing box 31 conducts heat exchange directly with the fresh outside air taken in, and therefore the outside air can be utilized as a low temperature heat source for cooling the reducing agent tank 30. In other words, because the fresh outside air is introduced to the periphery of the reducing agent tank without adding a device, the reducing agent tank 30 can be cooled efficiently.

(2) The frame hole 3a arranged in the rear frame 3 is arranged closer to the radiator 24 than the bulkhead 23, namely in the radiator chamber 123.

Therefore, the reducing agent supply pipe 32 is introduced to the radiator chamber 123, and the distance for passing through the inside of the engine chamber 122 that is hot can be shortened.

(3) The tank housing box 31 is arranged in the side of the rear frame 3, and closer to the radiator 24 than the bulkhead 23, namely in the side of the radiator chamber 123.

Therefore, the housing box hole 33 of the tank housing box 31 can be connected directly to the frame hole 3a of the rear frame 3. Because there is no pipe line between the housing box hole 33 and the frame hole 3a, movement of the air to the radiator chamber 123 is hardly hindered, the air having been taken in to the tank housing box 31 from the outside. In other words, much amount of the air is taken in to the tank housing box 31, and the effect of cooling the reducing agent tank 30 by the outside air is enhanced.

(4) The wheel loader 100 includes the counterweight 40 at the rear of the rear frame 3. The counterweight 40 includes the main weight section 40a, the side surface protection section 40b, and the bottom surface protection section 40c, the side surface protection section 40b protruding in the width direction of the rear frame 3 beyond the tank housing box 31, the bottom surface protection section 40c protruding in the downward direction of the rear frame 3 beyond the tank housing box 31.

Therefore, the tank housing box 31 can be protected by the counterweight 40.

(5) The wheel loader 100 includes the reducing agent supply port 36 and the fuel supply port 29, the reducing agent supply port 36 being arranged in the side surface of the rear frame 3 and introducing the reducing agent to the reducing agent tank 30, the fuel supply port 29 being arranged at a position at the rear of the rear frame 3 and closer to the tank housing box 31 than the center line CL of the rear frame 3, the fuel used in the engine 21 being poured to the fuel supply port 29.

Therefore, the fuel supply port 29 and the reducing agent supply port 36 are positioned in the rear portion and the side surface of the wheel loader 100, each installation surface is different, and therefore the operator does not mix up the both. Also, because the fuel supply port 29 and the reducing agent supply port 36 are positioned near to each other, the operator can get access to the both without moving. Further, because the reducing agent supply port 36 is positioned apart from the radiator fan 25 that discharges hot air, there is no risk that the temperature of the reducing agent rises and the quality deteriorates. In other words, when the position of the fuel supply port 29 and the reducing agent supply port 36 is substituted to each other, the heated air discharged by the radiator fan 25 passes through near the reducing agent supply port 36, the reducing agent supply port 36 and the reducing agent are also heated, and the reducing agent deteriorates, which is not preferable.

(Modification)

The embodiment described above can be implemented so as to be modified as follows.

(1) In the embodiment described above, the frame hole 3a arranged in the rear frame 3 and the housing box hole 33 arranged in the tank housing box 31 come in securely contact with each other and are thereby connected to each other, however, the connecting method is not limited to it. For example, the frame hole 3a and the housing box hole 33 may be connected to each other by a pipe, tube, and the like.

(2) In the embodiment described above, the tank housing box 31 is fixed to the rear frame3, however, the object of fixing the tank housing box 31 is not limited to the rear frame 3. The tank housing box 31 may be fixed to the cover 20, and may be fixed to the counterweight 40.

(3) In the embodiment described above, in order to connect the inner space of the radiator chamber 123 and the inner space of the tank housing box 31, the frame hole 3a is arranged in the rear frame 3, however, the opening portion of the radiator chamber 123 is not limited to it. It is also possible to arrange a hole in the cover 20 that covers the radiator chamber 123, to connect this hole and the housing box hole 33, and to connect thereby the inner space of the radiator chamber 123 and the inner space of the tank housing box 31.

(4) In the embodiment described above, the tank housing box 31 is disposed at a position adjacent to the frame hole 3a that was arranged in the radiator chamber 123, however, the disposal position of the tank housing box 31 is not limited to it. The tank housing box 31 may be arranged at a position not adjacent to the radiator chamber 123, for example at a position adjacent to the engine chamber 122. In this case, the frame hole 3a and the housing box hole 33 are connected to each other by a pipe, tube, and the like.

According to this modification 4, the degree of freedom of the position of the hole arranged in the radiator chamber 123 and the disposal position of the tank housing box 31 increases, and a variety of designs become possible.

(5) In the embodiment described above, the tank housing box 31 is arranged on the left side surface of the wheel loader 100, however, the tank housing box 31 may be arranged on the right side surface of the wheel loader 100. In this case, the position of the frame hole 3a and the fuel supply port 29 also may be arranged so as to be bilaterally symmetric with respect to the embodiment described above so as to match the tank housing box 31.

(6) In the embodiment described above, the tank housing box 31 of the wheel loader 100 includes the gap 34a of the opening/closing lid, the water drain hole 35, and the housing box slit 37. However, such a configuration including at least one of them is also possible.

Each embodiment and modification described above may be combined respectively.

Although various embodiments and modifications have been described above, the present invention is not limited to the contents of them. Other aspects conceived within the range of the technical thought of the present invention are also included within the range of the present invention.

The disclosed contents of the basic application for the right of priority described below are hereby incorporated by reference.

Japanese Patent Application No. 2014-260477 (applied on Dec. 24, 2014)

LIST OF REFERENCE SIGNS

3 . . . Rear frame (vehicle body frame)
3a . . . Frame hole (connection section)
20 . . . Cover
21 . . . Engine
22a . . . Reducing agent injection device (injection device)
23 . . . Bulkhead
24 . . . Radiator
25 . . . Radiator fan
29 . . . Fuel supply port
30 . . . Reducing agent tank (tank)
31 . . . Tank housing box (tank housing section)
32 . . . Reducing agent supply pipe
33 . . . Housing box hole (connection section)
34a . . . Gap of opening/closing lid (introducing section)
35 . . . Water drain hole (introducing section)
36 . . . Reducing agent supply port
37 . . . Housing box slit (introducing section)
40 . . . Counterweight
40a . . . Main weight section
40b . . . Side surface protection section
40c . . . Bottom surface protection section
100 . . . Wheel loader (construction machine)
123 . . . Radiator chamber (inner space of cover)

The invention claimed is:

1. A construction machine, comprising:
a vehicle body frame;
an engine that is mounted on the vehicle body frame;
a radiator that is mounted in a chamber at the rear of the vehicle body frame;
a bulkhead that separates the engine and the radiator;
a cover that covers the engine and the radiator;
a radiator fan that is arranged at the rear of the vehicle body frame and discharges exhaust gas toward the rear of the vehicle body frame from the inner space of the cover;
an injection device that injects a reducing agent into exhaust gas of the engine;
a tank housing section that is arranged laterally adjacent to the chamber, includes an introduction section for introducing outside air, and houses a tank for storing the reducing agent injected by the injection device; and
a connection section that is arranged in either the cover or the vehicle body frame and in the tank housing section, connects the inner space of the tank housing section and the inner space of the cover, and allows the outside air and a pipe to pass therethrough, the outside air having been introduced from the introduction section by the suction pressure of the radiator fan, the pipe supplying the reducing agent to the injection device.

2. The construction machine according to claim 1, wherein
the connection section that is arranged in either the cover or the vehicle body frame is arranged closer to the radiator than the bulkhead.

3. The construction machine according to claim 1, wherein
the tank housing section is arranged in one side of the vehicle body frame and closer to the radiator than the bulkhead.

4. The construction machine according to claim 2, wherein
the tank housing section is arranged in one side of the vehicle body frame and closer to the radiator than the bulkhead.

5. The construction machine according to claim 1, wherein
the introduction section is at least one of a gap arranged in an opening/closing section of the tank housing section, a slit of the tank housing section, and a water drain hole of the tank housing section.

6. The construction machine according to claim 1, further comprising:
a counterweight that is arranged at the rear of the vehicle body frame, wherein
the counterweight includes a main weight section, a side surface protection section that protrudes to the width direction of the vehicle body frame beyond the tank housing section, and a bottom surface protection section that protrudes to the downward direction of the vehicle body frame beyond the tank housing section.

7. The construction machine according to claim 1, further comprising:
a reducing agent supply port that is arranged on a side surface of the vehicle body frame and introduces the reducing agent to the tank; and
a fuel supply port that is arranged at a position at the rear of the vehicle body frame and closer to the tank housing section than the center line of the vehicle body frame, fuel used in the engine being supplied to the fuel supply port.

8. The construction machine according to claim 1, wherein the tank housing is located between the counterweight and the engine compartment.

9. The construction machine according to claim 1, wherein the chamber defines an opening that is upstream of the radiator in an air flow direction.

* * * * *